(12) United States Patent
Tokie

(10) Patent No.: US 11,218,479 B2
(45) Date of Patent: Jan. 4, 2022

(54) AUTHENTICATION BROKER APPARATUS AND NON-TRANSITORY COMPUTER READABLE MEDIUM STORING AUTHENTICATION BROKER PROGRAM

(71) Applicant: FUJIFILM BUSINESS INNOVATION CORP., Tokyo (JP)

(72) Inventor: Katsuji Tokie, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 210 days.

(21) Appl. No.: 16/587,107

(22) Filed: Sep. 30, 2019

(65) Prior Publication Data

US 2020/0322336 A1    Oct. 8, 2020

(30) Foreign Application Priority Data

Apr. 8, 2019   (JP) .............................. JP2019-073617

(51) Int. Cl.
*G06F 21/00* (2013.01)
*H04L 29/06* (2006.01)

(52) U.S. Cl.
CPC ........ *H04L 63/0884* (2013.01); *H04L 63/083* (2013.01)

(58) Field of Classification Search
CPC .......................... H04L 63/0884; H04L 63/083
See application file for complete search history.

(56) References Cited

U.S. PATENT DOCUMENTS

| | | | |
|---|---|---|---|
| 8,793,759 B2* | 7/2014 | Nishizawa | H04L 63/20 726/1 |
| 10,616,196 B1* | 4/2020 | Khitrenovich | G06N 20/00 |
| 10,678,906 B1* | 6/2020 | Loladia | G06F 21/33 |
| 2005/0223217 A1* | 10/2005 | Howard | H04L 63/0884 713/155 |
| 2008/0307530 A1* | 12/2008 | Lee | G06F 21/10 726/26 |
| 2009/0254561 A1* | 10/2009 | Shao | H04L 67/306 |
| 2019/0306146 A1* | 10/2019 | Kondo | G06F 21/335 |

FOREIGN PATENT DOCUMENTS

| | | |
|---|---|---|
| JP | 2013-137588 A | 7/2013 |
| JP | 2017-004296 A | 1/2017 |

* cited by examiner

*Primary Examiner* — Kendall Dolly
(74) *Attorney, Agent, or Firm* — Oliff PLC

(57) ABSTRACT

An authentication broker apparatus includes an extracting unit and a transmitting unit. In response to an authentication request from a service providing apparatus that provides a service, the extracting unit extracts, from identification managing apparatuses that manage user ID codes used by users to access a service, at least one ID managing apparatus that fulfills an authentication condition relating to authentication of the service providing apparatus that has requested authentication. The transmitting unit transmits, to the service providing apparatus, link information to access the at least one ID managing apparatus extracted by the extracting unit.

14 Claims, 7 Drawing Sheets

| AUTHENTICATION ITEM | RP_A | RP_B | IdP_A | IdP_C |
|---|---|---|---|---|
| TWO KINDS OF OFFICIAL IDENTIFICATION CARDS WITH PHOTOGRAPHS | UNNECESSARY | UNNECESSARY | | |
| ONE KIND OF OFFICIAL IDENTIFICATION CARD WITH PHOTOGRAPH | OPTIONAL | NECESSARY | ✓ | ✓ |
| ONE KIND OF OFFICIAL IDENTIFICATION CARD WITHOUT PHOTOGRAPH | NECESSARY | UNNECESSARY | | |
| PRESENTATION OF INDIVIDUAL FINANCIAL ACCOUNT NUMBER | UNNECESSARY | UNNECESSARY | | |
| PRESENTATION OF TELEPHONE NUMBER | OPTIONAL | NECESSARY | ✓ | ✓ |
| MULTI-FACTOR AUTHENTICATION | OPTIONAL | NECESSARY | ✓ | ✓ |
| SINGLE-FACTOR AUTHENTICATION | NECESSARY | UNUSABLE | | |
| PROTECTION AGAINST PHISHING/PHARMING | OPTIONAL | OPTIONAL | | ✓ |
| PROTECTION AGAINST WIRETAPPING | OPTIONAL | OPTIONAL | | ✓ |
| STRONG PROTECTION AGAINST MAN-IN-THE-MIDDLE ATTACK | OPTIONAL | OPTIONAL | | ✓ |
| WEEK PROTECTION AGAINST MAN-IN-THE-MIDDLE ATTACK | NECESSARY | NECESSARY | ✓ | ✓ |

| APPARATUS | GUARANTEE LEVEL |
|---|---|
| RP_A | L1 |
| RP_B | L2 |
| IdP_A | L1 |
| IdP_C | L2 |

| APPARATUS | LINK DESTINATION |
|---|---|
| RP_A | RP_A.com |
| RP_B | RP_B.com |
| IdP_A | IdP_A.com |
| IdP_C | IdP_C.com |

AUTHENTICATION BROKER APPARATUS AND NON-TRANSITORY COMPUTER READABLE MEDIUM STORING AUTHENTICATION BROKER PROGRAM

CROSS-REFERENCE TO RELATED APPLICATIONS

This application is based on and claims priority under 35 USC 119 from Japanese Patent Application No. 2019-073617 filed Apr. 8, 2019.

BACKGROUND

(i) Technical Field

The present disclosure relates to an authentication broker apparatus and a non-transitory computer readable medium storing an authentication broker program.

(ii) Related Art

Japanese Unexamined Patent Application Publication No. 2013-137588 discloses an identification (ID) provider device including a policy information storage unit, an authentication collaboration request preliminary processing unit, and an authentication collaboration request transfer unit. The policy information storage unit stores policy information representing a user of a target to whom transmission of service data is permitted. The authentication collaboration request preliminary processing unit performs a policy evaluation process and an account collaboration process at a timing according to a log-in status of a user terminal when an authentication collaboration request is received. The authentication collaboration request transfer unit transfers the authentication collaboration request to the authentication collaboration request preliminary processing unit when the authentication collaboration request is received from a service provider device.

Japanese Unexamined Patent Application Publication No. 2017-4296 discloses an authentication system connected to a cloud service. The authentication system includes a plurality of authentication infrastructure servers and a data collaboration server. User ID codes are registered in the plurality of authentication infrastructure servers. The data collaboration server acquires, from the cloud service, identifying information to identify an authentication infrastructure server in which a user ID code that coincides with a user ID code that has been input is registered, and the data collaboration server acquires, from the authentication infrastructure server, registered information corresponding to the user ID code that has been input, by using the identifying information.

SUMMARY

Service provision and management of user identification (ID) codes, which have been performed in a single system, are increasingly performed separately. Arrangements for authentication collaboration (federation) are known in the art. In such an arrangement, an authentication broker apparatus that mediates an authentication process between a service providing apparatus and an ID managing apparatus is disposed, and single sign-on, which enables a user to receive a plurality of provided services by using a single user ID code, is available.

However, such an authentication broker apparatus cannot mediate an authentication process between a service providing apparatus and an ID managing apparatus that has an authentication condition that differs from the authentication condition of the service providing apparatus. For example, if an authentication process is mediated between a service providing apparatus and an ID managing apparatus that has a looser authentication condition than the authentication condition of the service providing apparatus, a security issue may arise.

Aspects of non-limiting embodiments of the present disclosure relate to providing an authentication broker apparatus and a non-transitory computer readable medium storing an authentication broker program that can mediate an authentication process between a service providing apparatus that requests authentication and an ID managing apparatus that fulfills the authentication condition of the service providing apparatus.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an authentication broker apparatus including an extracting unit that, in response to an authentication request from a service providing apparatus that provides a service, extracts, from ID managing apparatuses that manage user ID codes used by users to access a service, at least one ID managing apparatus that fulfills an authentication condition relating to authentication of the service providing apparatus that has requested authentication, and a transmitting unit that transmits, to the service providing apparatus, link information to access the at least one ID managing apparatus extracted by the extracting unit.

BRIEF DESCRIPTION OF THE DRAWINGS

An exemplary embodiment of the present disclosure will be described in detail based on the following figures, wherein:

FIG. 6 is an illustration depicting an example of a condition fulfillment list;

FIG. 7 is an illustration depicting an example of guarantee level information; and FIG. 8 is an illustration depicting an example of link information.

DETAILED DESCRIPTION

Hereinafter, an exemplary embodiment of the present disclosure will be described in detail with reference to the drawings.

Figure 1:
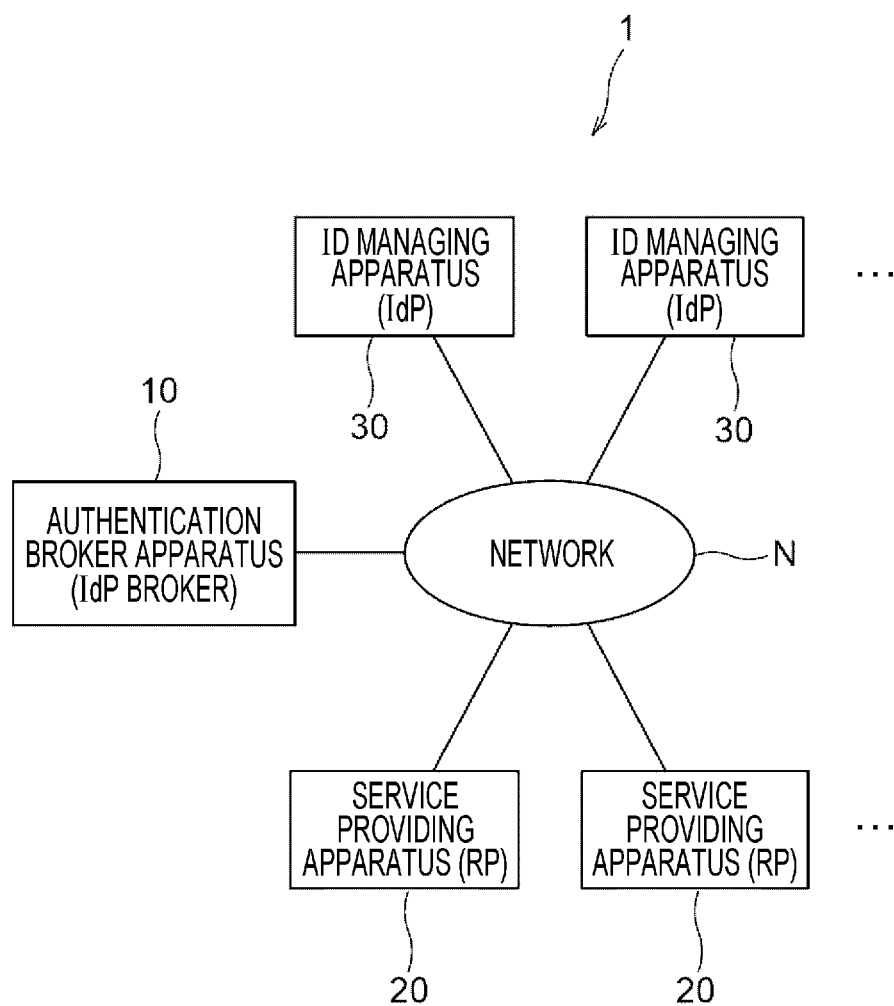
FIG. 1 depicts a configuration of an authentication broker system.

FIG. 1 depicts a configuration of an authentication broker system 1 according to the present exemplary embodiment.

The authentication broker system 1 has a configuration in which an authentication broker apparatus 10, a plurality of service providing apparatuses 20, and a plurality of identification (ID) managing apparatuses 30 are connected to each other via a network N.

When one of the service providing apparatuses 20 requests an authentication process for a user who uses the service providing apparatus 20, the authentication broker apparatus 10 mediates between the service providing apparatus 20 and one of the ID managing apparatuses 30 that performs an authentication process.

The service providing apparatuses 20 (each apparatus denoted by RP, which represents relying party) provide users with services. In the following description, a service indicates an electronic process provided to a user, and examples of a service include, but are not limited to, a process relating to document management, a process relating to storage management, and a process relating to transmission and reception of an email.

A user who uses a service provided by one of the service providing apparatuses 20 inputs user information including, for example, a user ID code and a password into the service providing apparatus 20 and provide instructions to use the service. In response to the instructions to use the service, the service providing apparatus 20 transmits the user information to the authentication broker apparatus 10 and requests an authentication process.

The ID managing apparatuses 30 (each apparatus denoted by IdP, which represents identity provider) manage user ID codes, which are used by users to access services, and perform authentication processes when the service providing apparatuses 20 request authentication.

Figure 2:
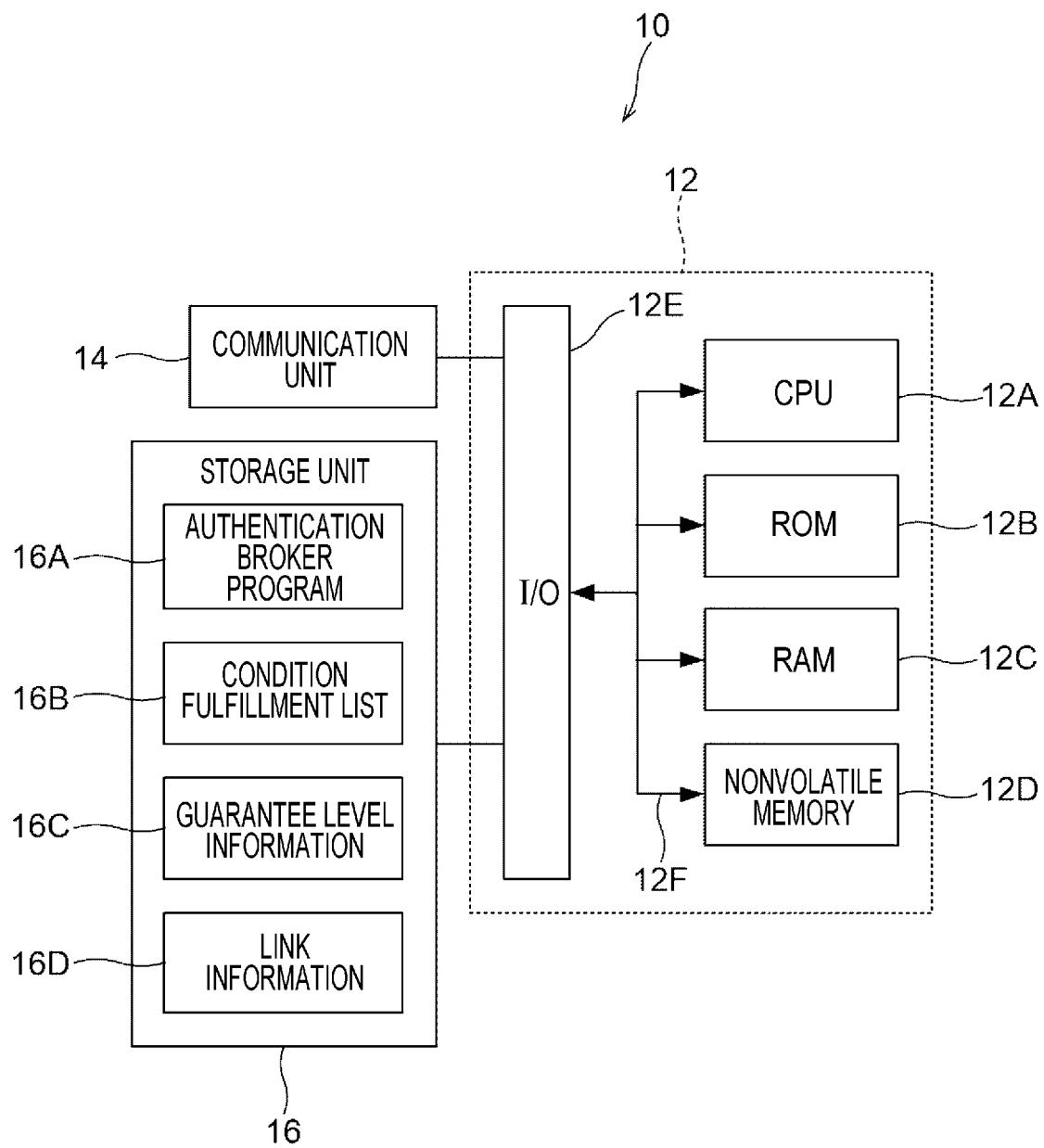
FIG. 2 is a block diagram depicting an electric configuration of an authentication broker apparatus.

FIG. 2 depicts a configuration of the authentication broker apparatus 10. The authentication broker apparatus 10 is constituted by a device including a general-purpose computer.

As depicted in FIG. 2, the authentication broker apparatus 10 includes a controller 12. The controller 12 includes a central processing unit (CPU) 12A, a read-only memory (ROM) 12B, a random-access memory (RAM) 12C, a nonvolatile memory 12D, and an input/output interface (I/O) 12E. The CPU 12A, the ROM 12B, the RAM 12C, the nonvolatile memory 12D, and the I/O 12E are connected to each other via a bus 12F.

In addition, a communication unit 14 and a storage unit 16 are connected to the I/O 12E.

The communication unit 14 is an interface to perform data communication with external apparatuses.

The storage unit 16 is constituted by a nonvolatile memory device such as a hard disk and stores an authentication broker program 16A, a condition fulfillment list 16B, guarantee level information 16C, link information 16D, and the like, which will be described below. The CPU 12A loads the authentication broker program 16A stored in the storage unit 16 and executes the authentication broker program 16A.

Next, a functional configuration of the CPU 12A in the authentication broker apparatus 10 that executes the authentication broker program 16A will be described.

Figure 3:
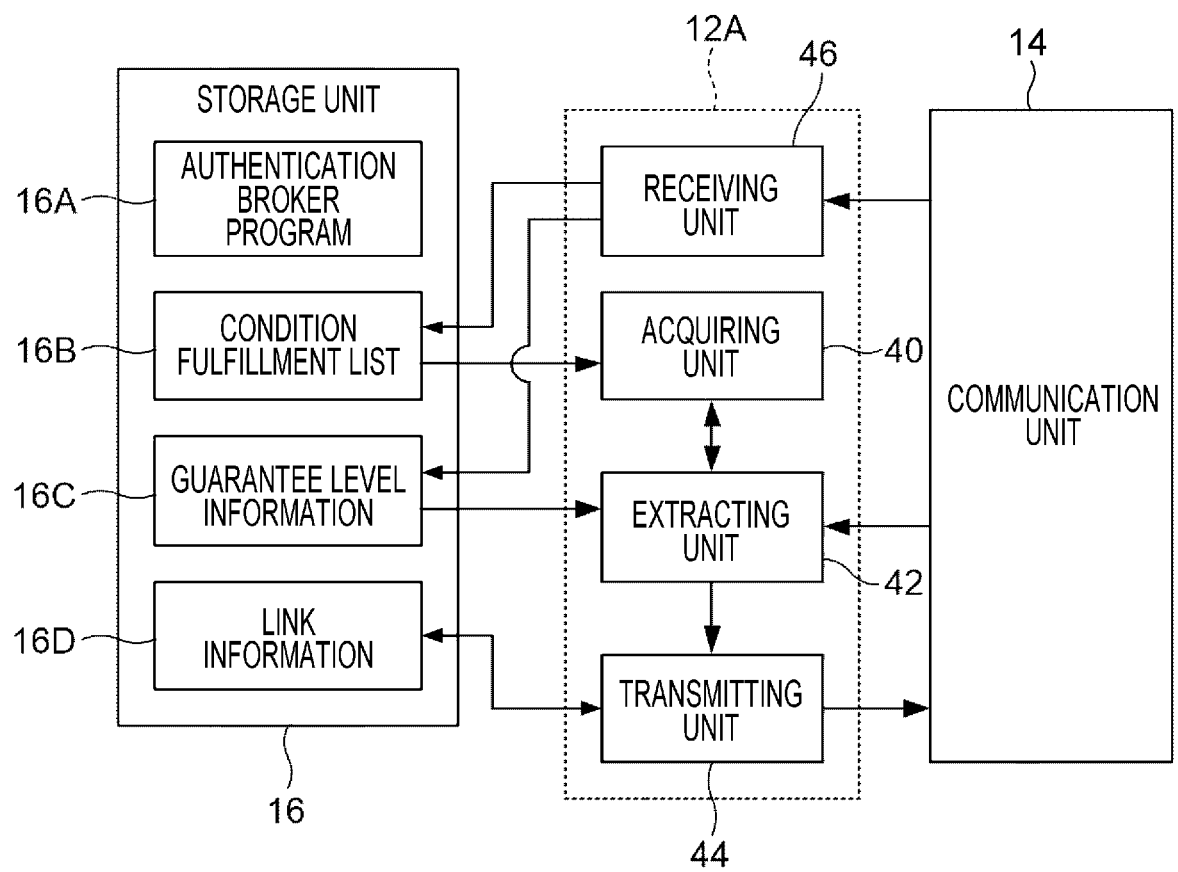
FIG. 3 is a block diagram depicting a functional configuration of the authentication broker apparatus.

As depicted in FIG. 3, the CPU 12A includes functions represented by an acquiring unit 40, an extracting unit 42, a transmitting unit 44, and a receiving unit 46.

The acquiring unit 40 reads the condition fulfillment list 16B from the storage unit 16 and acquires the condition fulfillment list 16B. The condition fulfillment list 16B registers and contains authentication conditions and fulfillment conditions. The authentication conditions relate to authentication of the service providing apparatuses 20 that provide services and include one or more authentication items, and the fulfillment conditions indicate whether the ID managing apparatuses 30 that manage user ID codes used by users to access services fulfill each of the one or more authentication items.

In response to an authentication request from one of the service providing apparatuses 20 that provide services, the extracting unit 42 extracts, from the ID managing apparatuses 30 that manage user ID codes used by users to access services, at least one ID managing apparatus 30 that fulfills the authentication condition relating to authentication of the service providing apparatus 20 that has requested authentication. Specifically, in response to an authentication request from one of the service providing apparatuses 20, at least one ID managing apparatus 30 that fulfills the authentication condition of the service providing apparatus 20 that has requested authentication is extracted in accordance with the condition fulfillment list 16B acquired by the acquiring unit 40.

The transmitting unit 44 transmits to the service providing apparatus 20 link information to access the at least one ID managing apparatus 30 extracted by the extracting unit 42.

The receiving unit 46 receives from the service providing apparatuses 20 information regarding whether fulfillment of each authentication item is necessary or optional.

In addition, the receiving unit 46 may receive information regarding whether fulfillment of each authentication item is unusable or unnecessary.

Further, the receiving unit 46 may receive as a necessary condition a condition that a predetermined number or more or a predetermined ratio or more of the authentication items received as optional is fulfilled.

The receiving unit 46 may also receive a plurality of registration patterns of an authentication condition to be registered in the condition fulfillment list 16B. In such a case, the extracting unit 42 extracts at least one of the ID managing apparatuses 30 for each of the plurality of registration patterns.

Further, the acquiring unit 40 may acquire from the guarantee level information 16C a guarantee level regarding authentication of the service providing apparatus 20 that has requested authentication and guarantee levels regarding authentication of the ID managing apparatuses 30. In such a case, in accordance with the condition fulfillment list 16B, the extracting unit 42 extracts, from the ID managing apparatuses 30 having guarantee levels that differ from the guarantee level regarding authentication of the service providing apparatus 20, at least one ID managing apparatus 30 that fulfills the authentication condition of the service providing apparatus 20 that has requested authentication. A guarantee level is a so-called level of assurance (LoA) and indicates a degree of assurance to which user authentication is guaranteed.

Figure 4:
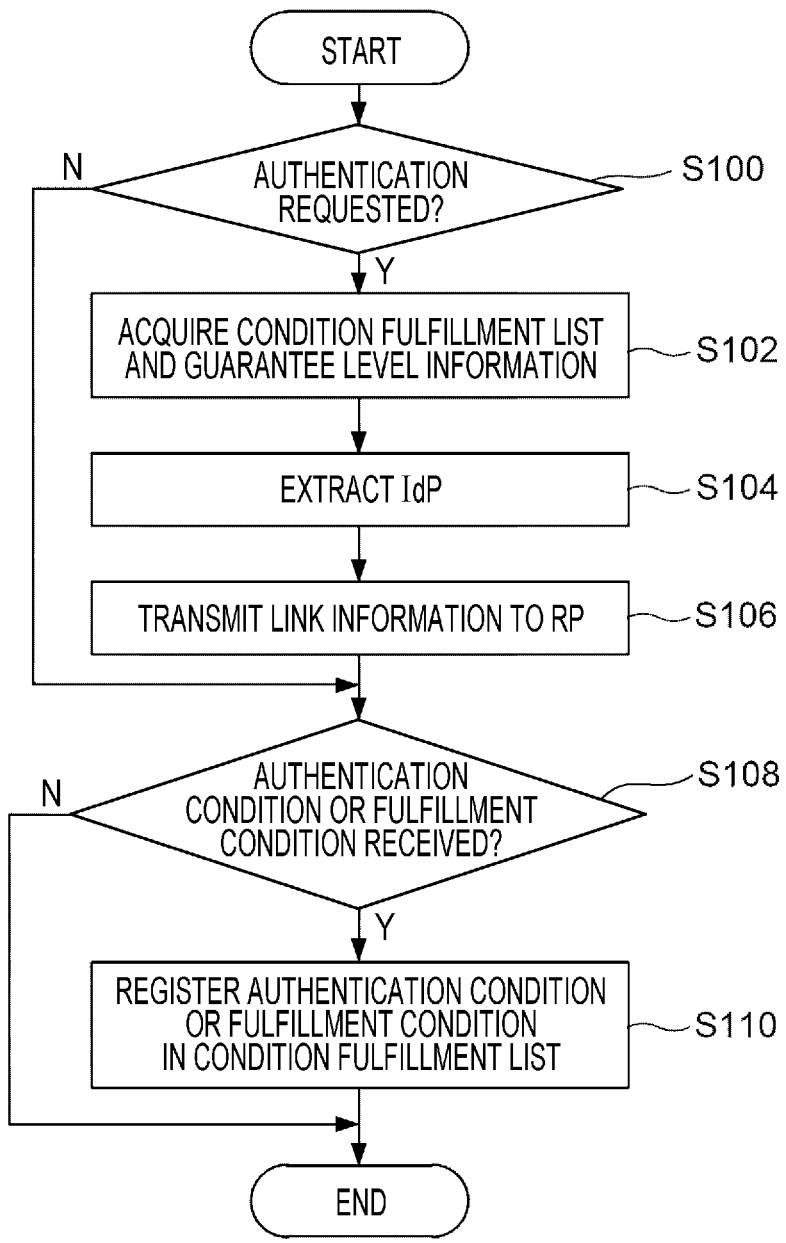
FIG. 4 is a flowchart depicting an example process flow of an authentication broker program.

Next, an operation of the authentication broker apparatus 10 according to the present exemplary embodiment will be described. As depicted in FIG. 2, the authentication broker program 16A is stored in the storage unit 16. The CPU 12A loads the authentication broker program 16A and executes the authentication broker program 16A, and an authentication broker process depicted in FIG. 4 is performed. The authentication broker process depicted in FIG. 4 is repeatedly performed at predetermined regular intervals.

Figure 5:
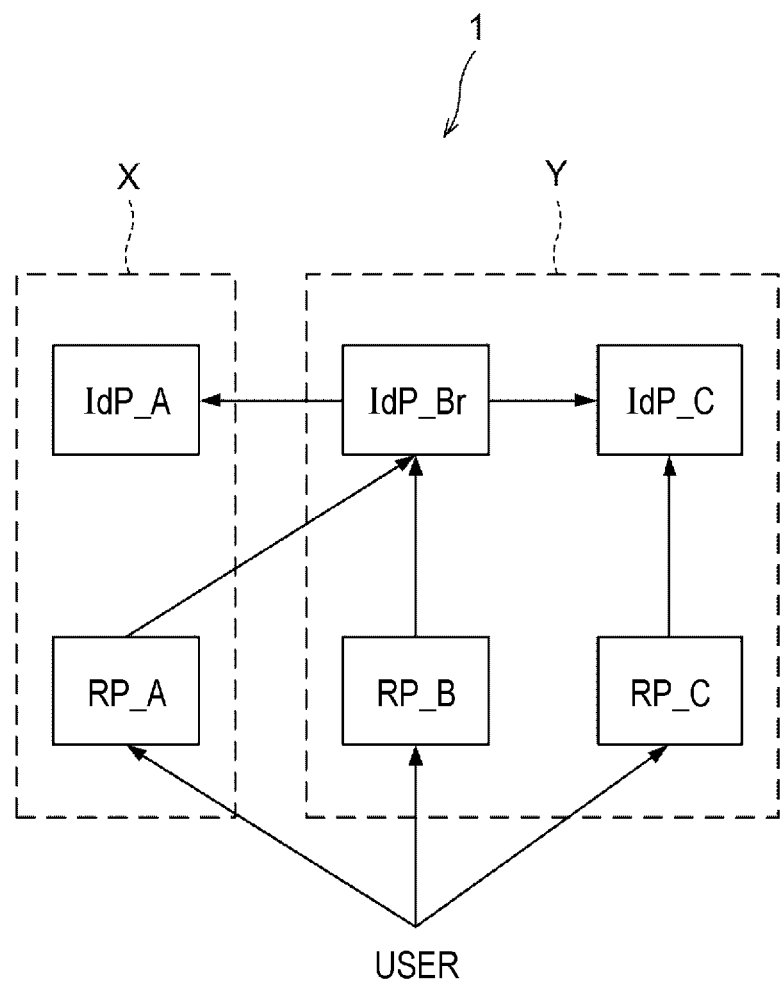
FIG. 5 is a diagram depicting specific connections in an authentication broker system.

In the following description, as depicted in FIG. 5, a case where the authentication broker system 1 is constituted by the authentication broker apparatus 10, which is denoted by IdP_Br, the service providing apparatuses 20, which are denoted by RP_A, RP_B, and RP_C, and the ID managing apparatuses 30, which are denoted by IdP_A and IdP_C, will be described. When the service providing apparatuses RP_A, RP_B, and RP_C are not individually referred to, each of the service providing apparatuses may be referred to simply as RP. In addition, when the ID managing apparatuses IdP_A and IdP_C are not individually referred to, each of the ID managing apparatuses may be referred to simply as IdP.

These apparatuses are classified into two groups in accordance with the guarantee level regarding authentication. In the example in FIG. 5, the service providing apparatus RP_A and the ID managing apparatus IdP_A belong to a group X, and the authentication broker apparatus IdP_Br, the ID managing apparatus IdP_C, and the service providing apparatuses RP_B and RP_C belong to a group Y. It is assumed that the guarantee levels of the apparatuses in the group X are the same and the guarantee levels of the apparatuses in the group Y are the same. It is also assumed that the guarantee level of the apparatuses belonging to the group Y is higher than the guarantee level of the apparatuses belonging to the group X.

In the example in the present exemplary embodiment, an apparatus is classified as a member of the group X or a member of the group Y in accordance with whether the apparatus is a member of a trust framework. A trust framework is a scheme in which members of the framework mutually guarantee credibility of user authentication. In the example depicted in FIG. 5, for example, the apparatuses belonging to the group Y are members of a trust framework, and the apparatuses belonging to the group X are not members of a trust framework.

In addition, in the example depicted in FIG. 5, it is also assumed that the ID managing apparatus IdP_A retains user information of users User_A and User_B, the ID managing apparatus IdP_C retains user information of users User_C and User_D, and the authentication broker apparatus IdP_Br retains user information of users User_A, User_B, User_C, and User_D.

A user inputs user information into a service providing apparatus RP from which the user wants to receive a service, and thereby the user requests service provision.

When authentication is requested by one of the users User_A to User_D via the service providing apparatus RP_A, the authentication broker apparatus IdP_Br can mediate, without difficulty, an authentication process between the service providing apparatus RP_A and the ID managing apparatus IdP_A, which has the same guarantee level as the guarantee level of the service providing apparatus RP_A. On the other hand, when authentication is requested by one of the users User_A to User_D via the service providing apparatus RP_A, as a general rule, the authentication broker apparatus IdP_Br cannot mediate an authentication process between the service providing apparatus RP_A and the ID managing apparatus IdP_C, which has a guarantee level that differs from the guarantee level of the service providing apparatus RP_A. However, if the ID managing apparatus IdP_C fulfills the authentication condition of the service providing apparatus RP_A, the authentication broker apparatus IdP_Br mediates an authentication process between the service providing apparatus RP_A and the ID managing apparatus IdP_C.

Further, when authentication is requested by one of the users User_A to User_D via the service providing apparatus RP_B, the authentication broker apparatus IdP_Br can mediate, without difficulty, an authentication process between the service providing apparatus RP_B and the ID managing apparatus IdP_C, which has the same guarantee level as the guarantee level of the service providing apparatus RP_B. On the other hand, when authentication is requested by one of the users User_A to User_D via the service providing apparatus RP_B, as a general rule, the authentication broker apparatus IdP_Br cannot mediate an authentication process between the service providing apparatus RP_B and the ID managing apparatus IdP_A, which has a guarantee level that differs from the guarantee level of the service providing apparatus RP_B. However, if the ID managing apparatus IdP_A fulfills the authentication condition of the service providing apparatus RP_B, the authentication broker apparatus IdP_Br mediates an authentication process between the service providing apparatus RP_B and the ID managing apparatus IdP_A.

The service providing apparatus RP_C is not connected to the authentication broker apparatus IdP_Br. Thus, the service providing apparatus RP_C is not affected by the ID managing apparatus IdP_A or by the service providing apparatus RP_A since the ID managing apparatus IdP_A and the service providing apparatus RP_A have a different guarantee level. Accordingly, when authentication is requested by the user User_C or User_D via the service providing apparatus RP_C, the ID managing apparatus IdP_C performs an authentication process.

In step S100, it is determined whether authentication is requested by one of the service providing apparatuses RP. Namely, it is determined whether user information has been received from one of the service providing apparatuses RP. If user information has been received from one of the service providing apparatuses RP, the process proceeds to step S102, and if no user information has been received from the service providing apparatuses RP, the process proceeds to step S108.

In step S102, the condition fulfillment list 16B is read and acquired from the storage unit 16. The condition fulfillment list 16B registers and contains authentication conditions and fulfillment conditions. The authentication conditions relate to authentication of the service providing apparatuses RP and include one or more authentication items. The fulfillment conditions indicate whether the ID managing apparatuses IdP fulfill each of the one or more authentication items. In addition, the guarantee level information 16C is read and acquired from the storage unit 16. The guarantee level of each service providing apparatus RP and the guarantee level of each ID managing apparatus IdP are registered in the guarantee level information 16C.

As depicted in FIG. 6, the condition fulfillment list 16B registers and contains the authentication conditions relating to authentication of the service providing apparatuses RP and the fulfillment conditions that indicate whether the ID managing apparatuses IdP fulfill each of the authentication items.

As depicted in FIG. 6, one of "necessary", "optional", "unusable", and "unnecessary" is registered for each authentication item for the service providing apparatuses RP in the condition fulfillment list 16B. An authentication item that is "necessary" indicates that the authentication item is indispensable. An authentication item that is "optional" indicates that authentication may be performed by using the authentication item or without using the authentication item. An authentication item that is "unusable" indicates that authentication cannot be performed by using the authentication item. An authentication item that is "unnecessary" indicates that the authentication item need not be used for authentication.

The condition fulfillment list 16B also registers and contains authentication items that each ID managing apparatus IdP fulfills. In FIG. 6, a box corresponding to an authentication item fulfilled by an ID managing apparatus IdP is checked, and a box corresponding to an authentication item that is not fulfilled by an ID managing apparatus IdP is left blank. Each service providing apparatus RP reports to the authentication broker apparatus IdP_Br in advance whether each authentication item is classified as "necessary", "optional", "unusable", or "unnecessary", and this information is registered in the condition fulfillment list 16B. In addition, each ID managing apparatus IdP reports to the authentication broker apparatus IdP_Br in advance whether each authentication item is fulfilled by the ID managing apparatus IdP, and this information is registered in the condition fulfillment list 16B.

Further, as depicted in FIG. 7, the guarantee level information 16C registers and contains guarantee levels of the service providing apparatuses RP and the ID managing apparatuses IdP. In the example in FIG. 7, the guarantee levels of the service providing apparatus RP_A and the ID managing apparatus IdP_A are set to L1, and the guarantee levels of the service providing apparatus RP_B and the ID managing apparatus IdP_C are set to L2. In the example in the present exemplary embodiment, L2 is larger than L1. Namely, the guarantee level of the service providing apparatus RP_B and the ID managing apparatus IdP_C is set to a higher level than the guarantee level of the service providing apparatus RP_A and the ID managing apparatus IdP_A.

In step S104, at least one of the ID managing apparatuses IdP, which fulfills the authentication condition of the service providing apparatus RP that has requested authentication, is extracted in accordance with the condition fulfillment list 16B and the guarantee level information 16C, which are acquired in step S102. Specifically, first, the guarantee level information 16C is referred to, and at least one of the ID managing apparatuses IdP, which has the same guarantee level as the guarantee level of the service providing apparatus RP that has requested authentication, is extracted.

Further, at least one of the ID managing apparatuses IdP, which fulfills the authentication condition of the service providing apparatus RP that has requested authentication, is extracted in accordance with the condition fulfillment list 16B from the ID managing apparatuses IdP having guarantee levels that differ from the guarantee level of the service providing apparatus RP that has requested authentication. The at least one ID managing apparatus IdP that fulfills the authentication condition of the service providing apparatus RP that has requested authentication represents at least one ID managing apparatus IdP that fulfills all the authentication items classified as "necessary" of all the authentication items set for the service providing apparatus RP. In other words, if at least one of the authentication items classified as "necessary" of all the authentication items set for the service providing apparatus RP is not fulfilled, the authentication condition of the service providing apparatus RP is not fulfilled.

Specifically, for example, when authentication is requested by one of the users User_A to User_D via the service providing apparatus RP_A, the ID managing apparatus IdP_A, which has the same guarantee level as the guarantee level of the service providing apparatus RP_A, is unconditionally extracted. On the other hand, the extraction of the ID managing apparatus IdP_C, which has a guarantee level that differs from the guarantee level of the service providing apparatus RP_A, depends on whether the authentication condition of the service providing apparatus RP_A is fulfilled. As depicted in FIG. 6, authentication items classified as "necessary" of the authentication items set for the service providing apparatus RP_A are "ONE KIND OF OFFICIAL IDENTIFICATION CARD WITHOUT PHOTOGRAPH", "SINGLE-FACTOR AUTHENTICATION", and "WEAK PROTECTION AGAINST MAN-IN-THE-MIDDLE ATTACK". Although the ID managing apparatus IdP_C fulfills the authentication item denoted by "WEAK PROTECTION AGAINST MAN-IN-THE-MIDDLE ATTACK", the ID managing apparatus IdP_C does not fulfill the authentication items denoted by "ONE KIND OF OFFICIAL IDENTIFICATION CARD WITHOUT PHOTOGRAPH" and "SINGLE-FACTOR AUTHENTICATION". Accordingly, the ID managing apparatus IdP_C is not extracted.

Further, for example, when authentication is requested by one of the users User_A to User_D via the service providing apparatus RP_B, the ID managing apparatus IdP_C, which has the same guarantee level as the guarantee level of the service providing apparatus RP_B, is unconditionally extracted. On the other hand, the extraction of the ID managing apparatus IdP_A, which has a guarantee level that differs from the guarantee level of the service providing apparatus RP_B, depends on whether the authentication condition of the service providing apparatus RP_B is fulfilled. As depicted in FIG. 6, authentication items classified as "necessary" of the authentication items set for the service providing apparatus RP_B are "ONE KIND OF OFFICIAL IDENTIFICATION CARD WITH PHOTOGRAPH", "PRESENTATION OF TELEPHONE NUMBER", "MULTI-FACTOR AUTHENTICATION", and "WEAK PROTECTION AGAINST MAN-IN-THE-MIDDLE ATTACK". The ID managing apparatus IdP_A fulfills all these authentication items. Accordingly, the ID managing apparatus IdP_A is also extracted.

The ID managing apparatus IdP that fulfills the authentication condition of the service providing apparatus RP that has requested authentication may be extracted in accordance with only the condition fulfillment list 16B without the acquisition of the guarantee level information 16C. Namely, irrespective of the guarantee levels, all the ID managing apparatuses IdP may be examined to determine whether the authentication condition of the service providing apparatus RP that has requested authentication is fulfilled.

In step S106, the link information 16D is read from the storage unit 16, and the link destination of the at least one ID managing apparatus IdP extracted in step S104 is acquired from the link information 16D that has been read. As depicted in FIG. 8, the link information 16D registers and contains link destinations of the service providing apparatuses RP and the ID managing apparatuses IdP. In the example depicted in FIG. 8, a link destination is represented by a uniform resource locator (URL), but this is not meant to be limiting. Then, the acquired link destination is transmitted as link information to the service providing apparatus RP that has requested authentication. In this way, link destinations of all the extracted ID managing apparatuses IdP are presented to the service providing apparatus RP, and the ID managing apparatuses IdP that can perform the authentication process can be accessed.

An administrator of the service providing apparatuses RP and the ID managing apparatuses IdP can request the registration of an authentication condition or a fulfillment condition in the condition fulfillment list 16B, for example, by inputting an authentication condition into one of the service providing apparatuses RP. The authentication condition or the fulfillment condition relates to at least one kind of the two kinds of apparatuses, which are the service providing apparatuses RP and the ID managing apparatuses IdP. In such a case, the service providing apparatus RP transmits the received authentication condition to the authentication broker apparatus IdP_Br and requests the authentication broker apparatus IdP_Br to register the authentication condition in the condition fulfillment list 16B.

Thus, in step S108, it is determined whether a request to register an authentication condition or a fulfillment condition in the condition fulfillment list 16B is received from one of the service providing apparatuses RP or one of the ID managing apparatuses IdP. Then, if a request to register an authentication condition or a fulfillment condition in the condition fulfillment list 16B is received, the process proceeds to step S110, and if no request to register an authentication condition or a fulfillment condition in the condition fulfillment list 16B is received, the process is terminated.

Fulfillment conditions that relate to the ID managing apparatuses IdP and that determine whether each of the authentication items set for the service providing apparatuses RP is fulfilled are received.

Authentication conditions that relate to the service providing apparatuses RP and that determine which of the plurality of conditions including "necessary" and "optional" applies to the fulfillment of each authentication item are received. In the example in the present exemplary embodiment, one of "necessary", "optional", "unusable", and "unnecessary" is received.

When an authentication condition relating to a service providing apparatus RP is received, a condition that a predetermined number or more or a predetermined ratio or more of the authentication items received as "optional" is fulfilled may be received as a necessary condition. For example, in the example depicted in FIG. 6, six authentication items denoted by "ONE KIND OF OFFICIAL IDENTIFICATION CARD WITH PHOTOGRAPH", "PRESENTATION OF TELEPHONE NUMBER", "MULTI-FACTOR AUTHENTICATION", "PROTECTION AGAINST PHISHING/PHARMING", "PROTECTION AGAINST WIRETAPPING", and "STRONG PROTECTION AGAINST MAN-IN-THE-MIDDLE ATTACK" are classified as "optional" in the authentication condition of the service providing apparatus RP_A. The fulfillment of at least a predetermined number of items, for example, three items or more (50% or more) of these six authentication items may be required as a necessary condition. In this case, an ID managing apparatus IdP that fulfills three or more authentication items of the six authentication items denoted by "ONE KIND OF OFFICIAL IDENTIFICATION CARD WITH PHOTOGRAPH", "PRESENTATION OF TELEPHONE NUMBER", "MULTI-FACTOR AUTHENTICATION", "PROTECTION AGAINST PHISHING/PHARMING", "PROTECTION AGAINST WIRETAPPING", and "STRONG PROTECTION AGAINST MAN-IN-THE-MIDDLE ATTACK" is to be extracted.

When an authentication condition relating to a service providing apparatus RP is received, a plurality of registration patterns of the authentication condition may be received for the registration in the condition fulfillment list 16B. In such a case, at least one of the ID managing apparatuses IdP for each of the plurality of registration patterns is extracted. In such a case, for example, if it is determined that the first registration pattern registered as an authentication condition is stricter than the second registration pattern registered as an authentication condition, the service providing apparatus RP can provide services for all the functions to a user who meets the first registration pattern registered as an authentication condition and provide services for some functions to a user who meets the second registration pattern registered as an authentication condition.

Further, a request to add a new authentication item, which is not registered in the condition fulfillment list 16B, may be received from the service providing apparatuses RP.

In step S110, the authentication condition or the fulfillment condition received in step S108 is registered in the condition fulfillment list 16B.

The exemplary embodiment has been described as above, but the technical scope of the present disclosure is not limited to the range described in the above exemplary embodiment. Various modifications and improvements to the above exemplary embodiment are possible without departing from the spirit of the present disclosure, and embodiments incorporating such modifications or improvements are also within the technical scope of the present disclosure.

For example, in the present exemplary embodiment, a case where each of the service providing apparatuses RP or each of the ID managing apparatuses IdP is classified as a member of the group X or a member of the group Y in accordance with whether each of the apparatuses is a member of a trust framework has been described, but this is not meant to be limiting. For example, an apparatus may be classified as a member of the group X or a member of the group Y in accordance with a difference in a degree of sensitivity of the apparatus. The degree of sensitivity represents the power of influence of information handled by an apparatus. For example, if an apparatus having a relatively low degree of sensitivity is classified as a member of the group X and an apparatus having a relatively high degree of sensitivity is classified as a member of the group Y, apparatuses are classified in a manner similar to the case where apparatuses are classified in accordance with whether the apparatuses belong to a trust framework.

The above exemplary embodiment is not intended to limit the disclosure defined by the claims, and not all of the combinations of features described in the exemplary embodiment are necessary to constitute a solution in the disclosure. The exemplary embodiment described above includes examples in various stages, and various examples are extracted in accordance with combinations of a plurality of disclosed elements. If some elements of all the elements described in the exemplary embodiment are removed, the configuration with these elements removed can be extracted as an example as long as an effect is obtained.

Further, in the above exemplary embodiment, the case where the authentication broker program 16A is stored in the storage unit 16 in advance has been described, but the present disclosure is not limited to this example. For example, the authentication broker program 16A may be stored on a recording medium such as a compact disc read-only memory (CD-ROM) and supplied, or the authentication broker program 16A may be supplied via a network.

Further, in the above exemplary embodiment, the case where the authentication broker process is realized by using a software configuration in which a computer executes a program has been described, but the present disclosure is not limited to this example. The authentication broker process may be realized, for example, by using a hardware configuration or a combination of a hardware configuration and a software configuration.

In addition, the configuration of the authentication broker apparatus 10 (refer to FIG. 2) described in the above exemplary embodiment is intended to be illustrative. Obviously, an unnecessary element may be removed, or a new element may be added without departing from the spirit of the present disclosure.

The process flow of the authentication broker program 16A (refer to FIG. 4) described in the above exemplary embodiment is also intended to be illustrative. Obviously, an unnecessary step may be removed, a new step may be added, or a process order may be changed without departing from the spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An authentication broker apparatus comprising:
    a memory storing instructions;
    a processor configured to execute the instructions to:
        in response to an authentication request from a first service providing apparatus that provides a service, extract, from identification (ID) managing apparatuses that manage user ID codes used by users to access a service, at least one ID managing apparatus that fulfills the authentication condition for authentication of the first service providing apparatus; and
        transmit, to the first service providing apparatus, link information to access the at least one ID managing apparatus extracted by the processor; and
        acquire a condition fulfillment information in which an authentication condition and fulfillment conditions are registered, the authentication condition relating to a condition required to authentication of the service providing apparatus and including one or more authentication items, the fulfillment conditions indicating whether the ID managing apparatuses fulfill each of the one or more authentication items, authentication condition which indicates a condition required for authentication of each of a plurality of service providing apparatuses,
    wherein, in response to an authentication request from the service providing apparatus, the at least one ID managing apparatus, which fulfills an authentication condition of the service providing apparatus that has requested authentication, is extracted in accordance with the condition fulfillment information.

2. The authentication broker apparatus according to claim 1, wherein the processor is configured to:
    receive the authentication condition and register the authentication condition in the condition fulfillment information.

3. The authentication broker apparatus according to claim 2,
    wherein the processor is configured to receive which of a plurality of conditions including "necessary" and "optional" applies to fulfillment of each authentication item included in the authentication condition.

4. The authentication broker apparatus according to claim 3,
    wherein the processor is configured to receive, as a necessary condition, a condition that a predetermined number or more or a predetermined ratio or more of the authentication items received as "optional" is fulfilled.

5. The authentication broker apparatus according to claim 2,
    wherein the processor is configured to receive a plurality of registration patterns of the authentication condition that are to be registered in the condition fulfillment information.

6. The authentication broker apparatus according to claim 3,
    wherein the processor is configured to receive a plurality of registration patterns of the authentication condition that are to be registered in the condition fulfillment information.

7. The authentication broker apparatus according to claim 4,
    wherein the processor is configured to receive a plurality of registration patterns of the authentication condition that are to be registered in the condition fulfillment information.

8. The authentication broker apparatus according to claim 5,
    wherein the processor is configured to extract at least one of the ID managing apparatuses for each of the plurality of registration patterns.

9. The authentication broker apparatus according to claim 6,
    wherein the processor is configured to extract at least one of the ID managing apparatuses for each of the plurality of registration patterns.

10. The authentication broker apparatus according to claim 7,
    wherein the processor is configured to extract at least one of the ID managing apparatuses for each of the plurality of registration patterns.

11. The authentication broker apparatus according to claim 1,
    wherein the processor is configured to acquire a guarantee level regarding authentication of the service providing apparatus that has requested authentication and guarantee levels regarding authentication of the ID managing apparatuses.

12. The authentication broker apparatus according to claim 11,
    wherein, in accordance with the condition fulfillment information, the processor is configured to extract, from the ID managing apparatuses having guarantee levels that differ from the guarantee level regarding authentication of the service providing apparatus, the at least one ID managing apparatus that fulfills an authentication condition of the service providing apparatus that has requested authentication.

13. A non-transitory computer readable medium storing an authentication broker program causing a computer to execute a process for authentication brokering, the process comprising:
    extracting in response to an authentication request from a first service providing apparatus that provides a service, from ID managing apparatuses that manage user ID codes used by users to access a service, at least one ID managing apparatus that fulfills the authentication condition for authentication of the first service providing apparatus; and transmitting, to the first service providing apparatus, link information to access the at least one ID managing apparatus that is extracted; and acquiring a condition fulfillment information in which an authentication condition and fulfillment conditions are registered, the authentication condition relating to a condition required to authentication of the service providing apparatus and including one or more authentication items, the fulfillment conditions indicating whether the ID managing apparatuses fulfill each of the one or more authentication items, wherein, in response to an authentication request from the service providing apparatus, the at least one ID managing apparatus, which fulfills an authentication condition of the service providing apparatus that has requested authentication, is extracted in accordance with the condition fulfillment information.

14. An authentication broker apparatus comprising:

means for extracting in response to an authentication request from a service providing apparatus that provides a service, from ID managing apparatuses that manage user ID codes used by users to access a service, at least one ID managing apparatus that fulfills the authentication condition for authentication of the first service providing apparatus; and means for transmitting, to the first service providing apparatus, link information to access the at least one ID managing apparatus that is extracted; and means for acquiring a condition fulfillment information in which an authentication condition and fulfillment conditions are registered, the authentication condition relating to a condition required to authentication of the service providing apparatus and including one or more authentication items, the fulfillment conditions indicating whether the ID managing apparatuses fulfill each of the one or more authentication items, wherein, in response to an authentication request from the service providing apparatus, the at least one ID managing apparatus, which fulfills an authentication condition of the service providing apparatus that has requested authentication, is extracted in accordance with the condition fulfillment information.

\* \* \* \* \*